United States Patent
Oana et al.

(10) Patent No.: US 10,746,152 B2
(45) Date of Patent: Aug. 18, 2020

(54) IGNITION DEVICE

(71) Applicant: Toyo Denso Co., Ltd., Tokyo (JP)

(72) Inventors: Takeshi Oana, Tsurugashima (JP); Kousuke Yoshida, Tsurugashima (JP)

(73) Assignee: TOYO DENSO CO., LTD., Tokyo (JP)

( * ) Notice: Subject to any disclaimer, the term of this patent is extended or adjusted under 35 U.S.C. 154(b) by 0 days.

(21) Appl. No.: 16/447,333

(22) Filed: Jun. 20, 2019

(65) Prior Publication Data

US 2019/0390642 A1   Dec. 26, 2019

(30) Foreign Application Priority Data

Jun. 21, 2018   (JP) .................. 2018-117965

(51) Int. Cl.
*F02P 1/02*      (2006.01)
*F02P 3/02*      (2006.01)
*F02P 1/00*      (2006.01)

(52) U.S. Cl.
CPC .................. *F02P 1/02* (2013.01); *F02P 1/005* (2013.01); *F02P 3/02* (2013.01)

(58) Field of Classification Search
CPC ...... F02P 1/02; F02P 3/02; F02P 1/005; F02P 3/053; F02P 1/083; F02P 5/1502; F02P 1/08; F02P 3/04
See application file for complete search history.

(56) References Cited

U.S. PATENT DOCUMENTS

| 2009/0126686 | A1  | 5/2009  | Sugiyama et al. |
| 2012/0048233 | A1* | 3/2012  | Bungo ............... F02D 17/04 123/434 |
| 2016/0047349 | A1* | 2/2016  | Ayusawa ............. F02P 1/083 123/406.23 |
| 2019/0338746 | A1* | 11/2019 | Heubeck ............. F02P 1/08 |

FOREIGN PATENT DOCUMENTS

| JP | 1-219356 A    | 9/1989 |
| JP | 2009-121376 A | 6/2009 |
| JP | 2010-180854 A | 8/2010 |

* cited by examiner

*Primary Examiner* — Joseph J Dallo
(74) *Attorney, Agent, or Firm* — Birch, Stewart, Kolasch & Birch, LLP

(57) ABSTRACT

In an ignition device, a proportion of a yoke end width defined as a distance from one end to another end of an end portion of each of a pair of yokes in the circumferential direction to a magnet width defined as a distance from one end to another end of a permanent magnet disposed on the outer circumferential surface of a flywheel, in the circumferential direction is in a range of 60% to 100%. Moreover, a proportion of the magnet width to a yoke interval between the pair of yokes is in a range of 95% to 100%.

8 Claims, 7 Drawing Sheets

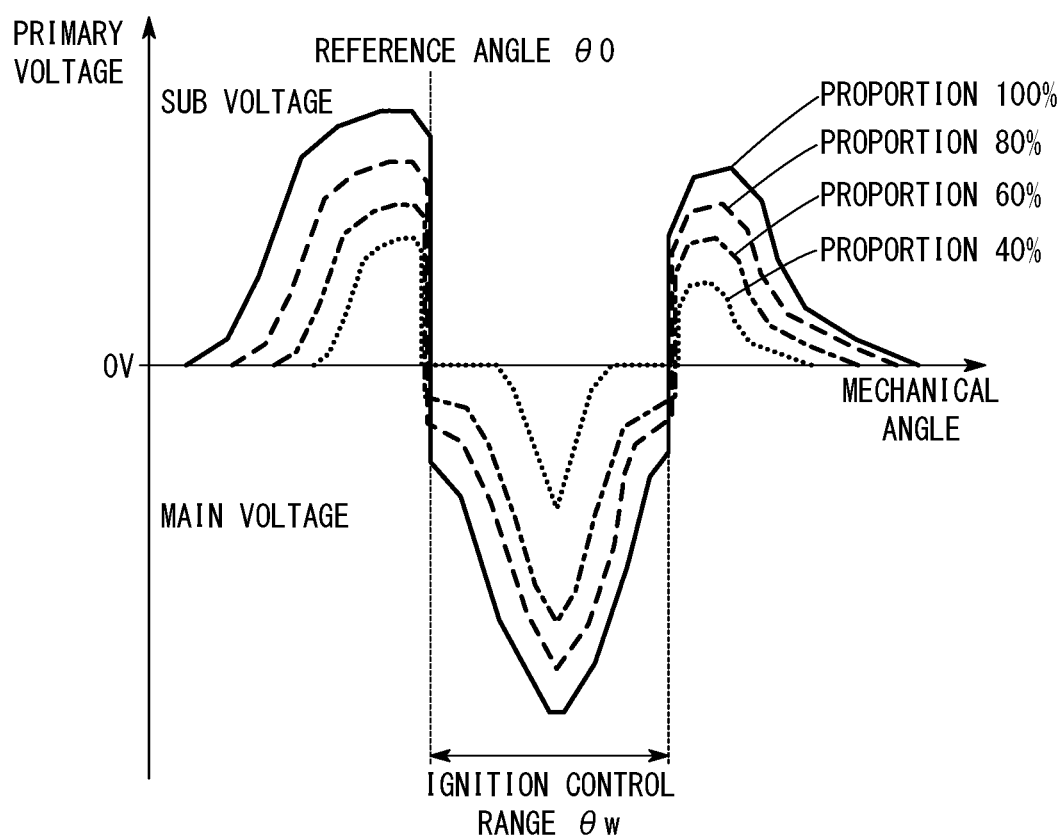

IGNITION DEVICE

CROSS-REFERENCE TO RELATED APPLICATION

This application is based upon and claims the benefit of priority from Japanese Patent Application No. 2018-117965 filed on Jun. 21, 2018, the contents of which are incorporated herein by reference.

BACKGROUND OF THE INVENTION

Field of the Invention

The present invention relates to an ignition device used for a general-purpose internal combustion device (engine).

Description of the Related Art

Internal combustion devices (engines) often use magnet generators generating electric power using permanent magnets. A magnet generator includes an ignition coil and an ignition drive circuit for driving the ignition coil.

The ignition coil includes a core, a primary coil wound around the outer circumference of the core, and a secondary coil wound around the outer circumference of the primary coil. The ignition drive circuit causes a primary current to flow in the ignition coil using a primary voltage induced in the primary coil and shuts off the primary current to induce a secondary voltage for ignition in the secondary coil.

Japanese Laid-Open Patent Publication No. 01-219356 discloses a transistor ignition device with timing advance as such a magnet generator. The transistor ignition device with timing advance reduces the peak current value at which the current flowing in the ignition coil is shut off, as the engine rpm increases, whereby the spark energy is kept at a substantially constant level during high speed rotation.

SUMMARY OF THE INVENTION

However, the advance range of the transistor ignition device with timing advance disclosed in Japanese Laid-Open Patent Publication No. 01-219356 cannot be changed greatly. Thus, the device is not sufficiently effective in increasing the output power and the fuel efficiency of the engine, and it is assumed that the output power of the internal combustion device decreases.

The present invention has been devised taking into consideration the aforementioned problems, and has the object of providing an ignition device capable of increasing the output power of an internal combustion device while improving the startability.

According to an aspect of the present invention, an ignition device includes a core disposed on an outer side of a flywheel, an ignition unit provided on the core, and a pair of yokes spaced from each other so as to interpose the ignition unit between the yokes and extending from one end and another end of the core toward the flywheel, wherein the ignition unit includes a primary coil wound around an outer circumferential side of the core, a secondary coil wound around an outer circumferential side of the primary coil, an ignition drive circuit configured to cause a primary current to flow in the primary coil using a primary voltage induced in the primary coil and also configured to shut off the primary current to thereby induce a secondary voltage in the secondary coil, a control circuit configured to control the ignition drive circuit, and a power circuit including a booster section configured to boost the primary voltage, the power circuit being configured to generate a driving voltage for driving the control circuit using the boosted primary voltage, wherein an end portion of each of the pair of yokes protrudes so as to be away from the core in a circumferential direction of the flywheel, wherein a proportion of a yoke end width defined as a distance from one end to another end of the end portion in the circumferential direction to a magnet width defined as a distance from one end to another end of a permanent magnet disposed on an outer circumferential surface of the flywheel, in the circumferential direction is in a range of 60% to 100%, and wherein a proportion of the magnet width to a yoke interval between the pair of yokes is in a range of 95% to 100%.

According to the present invention, the output power of an internal combustion device can be increased while the startability thereof is improved.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a chart showing waveforms of the primary voltage in Example 2.

DESCRIPTION OF THE PREFERRED EMBODIMENTS

A preferred embodiment of the present invention will be described in detail below with reference to the accompanying drawings.

Figure 1:
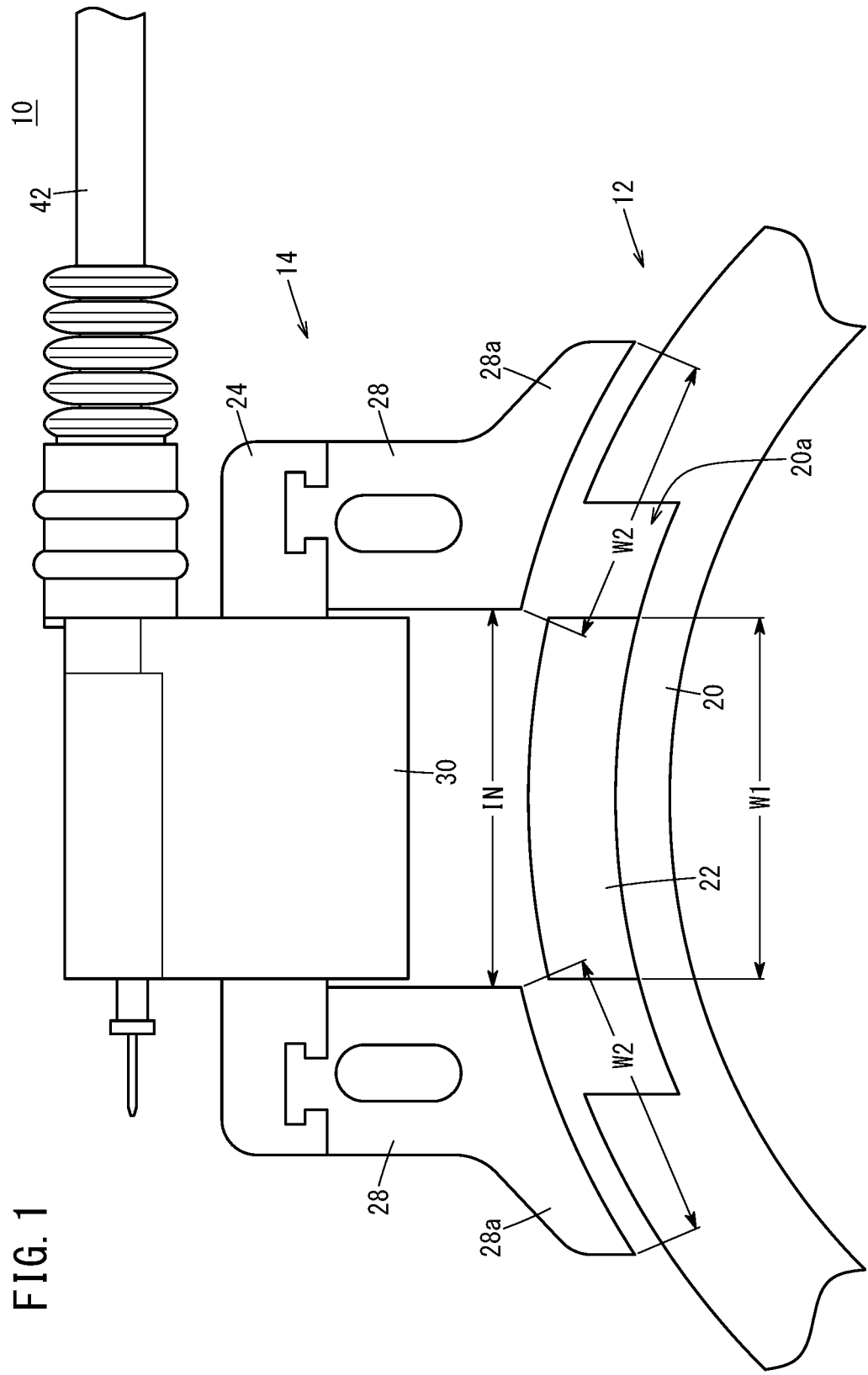
FIG. 1 is a view showing a part of an internal combustion device.

The configuration of an internal combustion device 10 will now be described with reference to FIGS. 1 and 2. The internal combustion device 10 is a motor or engine using, as a working fluid, gas produced by burning fuel inside cylinders. The internal combustion device 10 includes a magnet rotor 12 and an ignition device 14.

The magnet rotor 12 is a rotor including a flywheel 20 and a permanent magnet 22. The flywheel 20 has an annular shape and is attached to a crankshaft (not illustrated) in the internal combustion device 10 to rotate in conjunction with the rotation of the crankshaft. A recess portion 20a is formed in a part of the outer circumference of the flywheel 20.

The permanent magnet 22 is fixed to the interior of the recess portion 20a of the flywheel 20 and disposed on the outer circumferential surface of the flywheel 20. The permanent magnet 22 is magnetized such that the magnetization direction is oriented in a radial direction of the flywheel 20. Opposite end portions of the recess portion 20a in the circumferential direction of the flywheel 20 are magnetized by the permanent magnet 22, and the magnetic poles of the end portions are opposite to the magnetic poles of the outer circumferential portions of the permanent magnet 22.

The ignition device 14 is a stator including a core 24, an ignition unit 26 (see FIG. 2), and a pair of yokes 28. The core 24 is a core member having a rod shape and is disposed on the outer side of the flywheel 20. The core 24 extends substantially straight in a direction substantially orthogonal to the axial direction of the crankshaft and radial direction of the flywheel 20.

Figure 2:
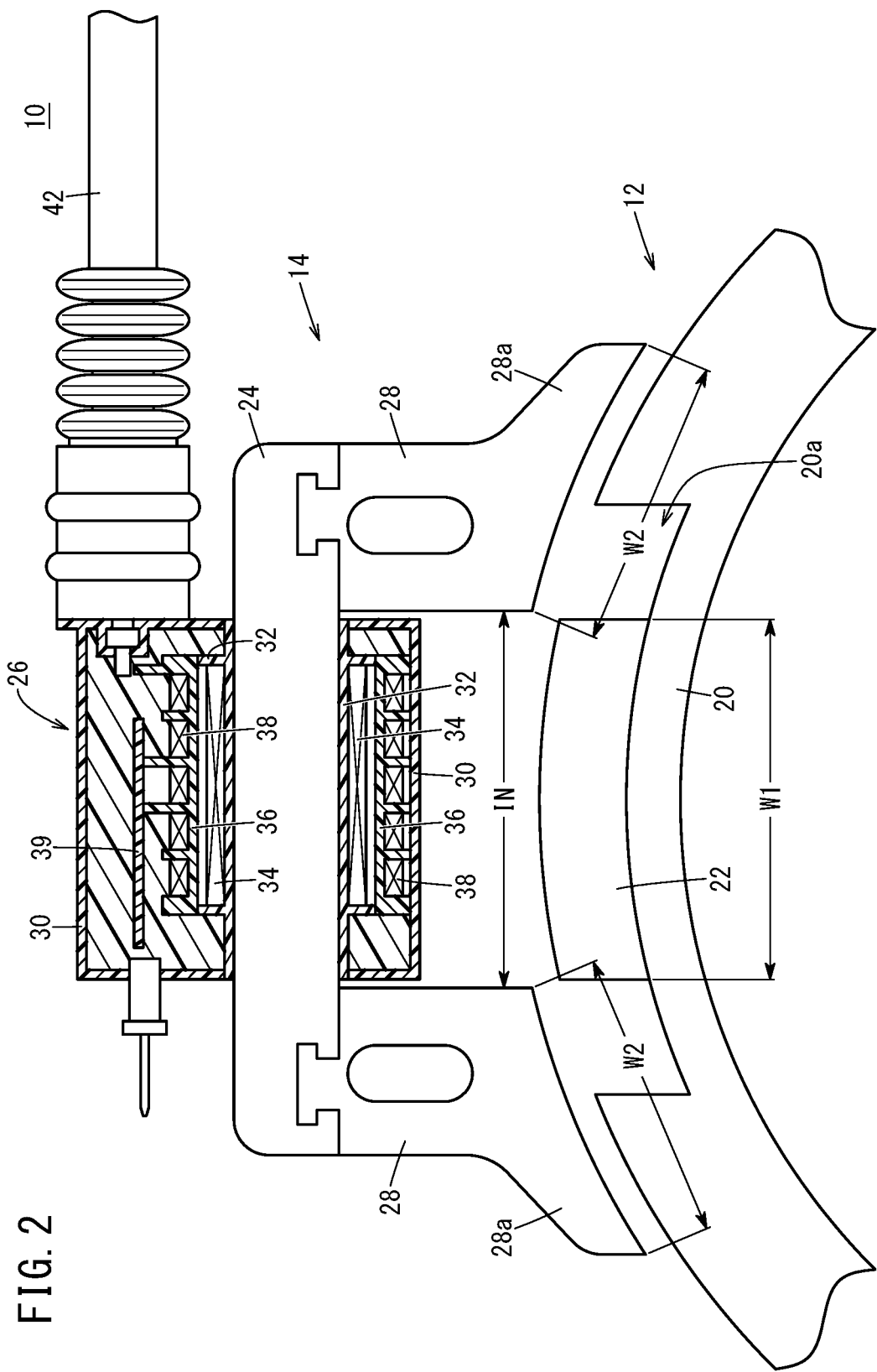
FIG. 2 is a partially sectioned view of the device shown in FIG. 1.

As illustrated in FIG. 2, the ignition unit 26 includes a case 30, which contains therein a primary bobbin 32, a primary coil 34, a secondary bobbin 36, a secondary coil 38, and a substrate 39. The primary bobbin 32 is disposed around the outer circumference of the core 24. The primary coil 34 is wound around the primary bobbin 32 on the outer circumferential side of the core 24. The secondary bobbin 36 is disposed around the outer circumference of the primary coil 34. The secondary coil 38 is wound around the secondary bobbin 36 on the outer circumferential side of the primary coil 34. The substrate 39 is supported by the secondary bobbin 36 on the outer circumferential side of the secondary coil 38. The substrate 39 is provided with a circuit of the ignition device 14 described below.

The secondary coil 38 and a spark plug 40 (see FIG. 4) disposed outside the case 30 are connected to each other by a cord 42. A secondary voltage for ignition induced in the secondary coil 38 is applied to the spark plug 40 via the cord 42. The case 30 is secured to, for example, a housing of the internal combustion device 10, and the interior of the case 30 is filled with resin such as epoxy resin.

The pair of yokes 28 are connected to the core 24 and spaced from each other so as to interpose the ignition unit 26 between the yokes. The yokes extend from respective ends of the core 24 toward the flywheel 20. In the example illustrated in FIGS. 1 and 2, the pair of yokes 28 and the core 24 are mutually connected so as to form a substantially "C" shape.

Figure 3:
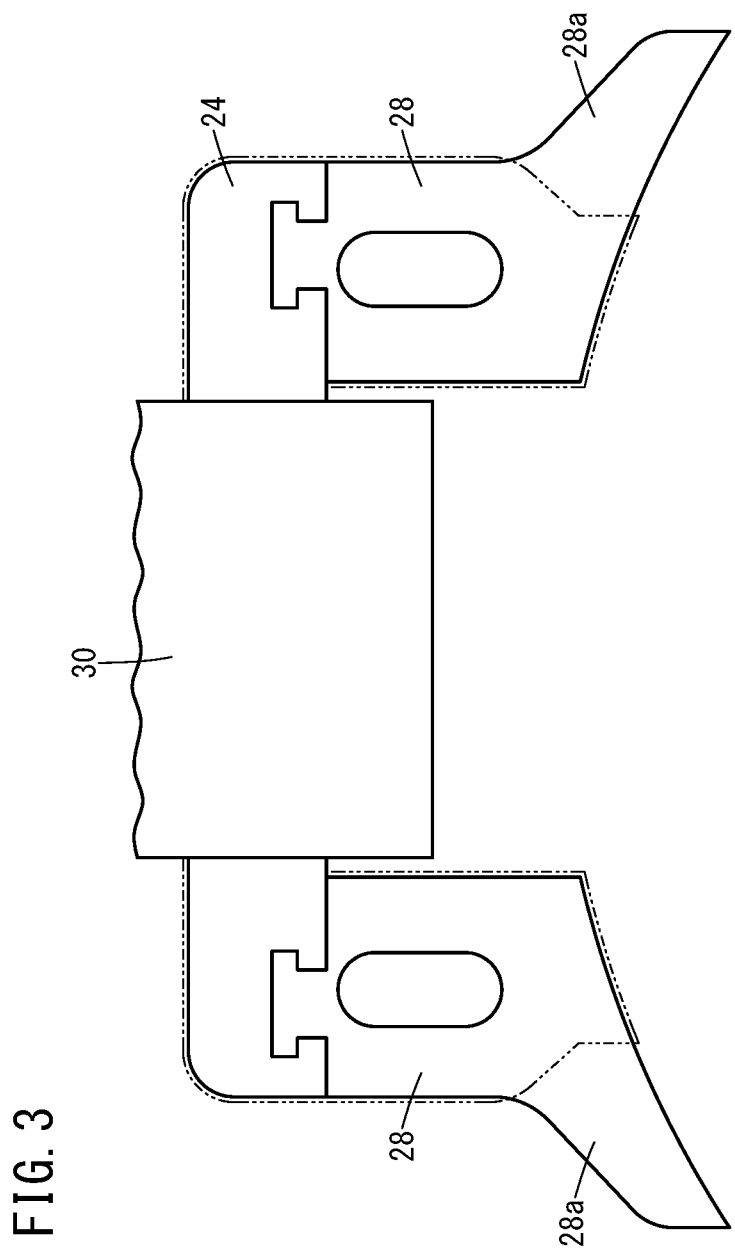
FIG. 3 is a view showing a difference in shape from a conventional yoke.

End portions 28a of the respective yokes 28 in the pair are spaced from the flywheel 20 at a small distance, and protrude away from the end portions of the core 24 in the circumferential direction of the flywheel 20. As indicated by long dashed double-short dashed lines in FIG. 3, conventional pairs of yokes often do not have such end portions protruding in directions away from the end portions of the core 24.

In this embodiment, the proportion of a yoke end width W2 to a magnet width W1 is in a range of 60% to 100%, and the proportion of the magnet width W1 to a yoke interval IN is in a range of 95% to 100%. Setting these proportions increases the output power of the internal combustion device 10 while improving the startability. This will be described below.

The magnet width W1 is a linear distance from one end to the other end of the permanent magnet 22 disposed on the outer circumferential surface of the flywheel 20, in the circumferential direction of the flywheel 20. The yoke end width W2 is a linear distance from one end to the other end of the end portion 28a of the yoke 28, in the circumferential direction of the flywheel 20. The yoke interval IN is a linear distance between the pair of yokes 28 spaced from each other.

Figure 4:
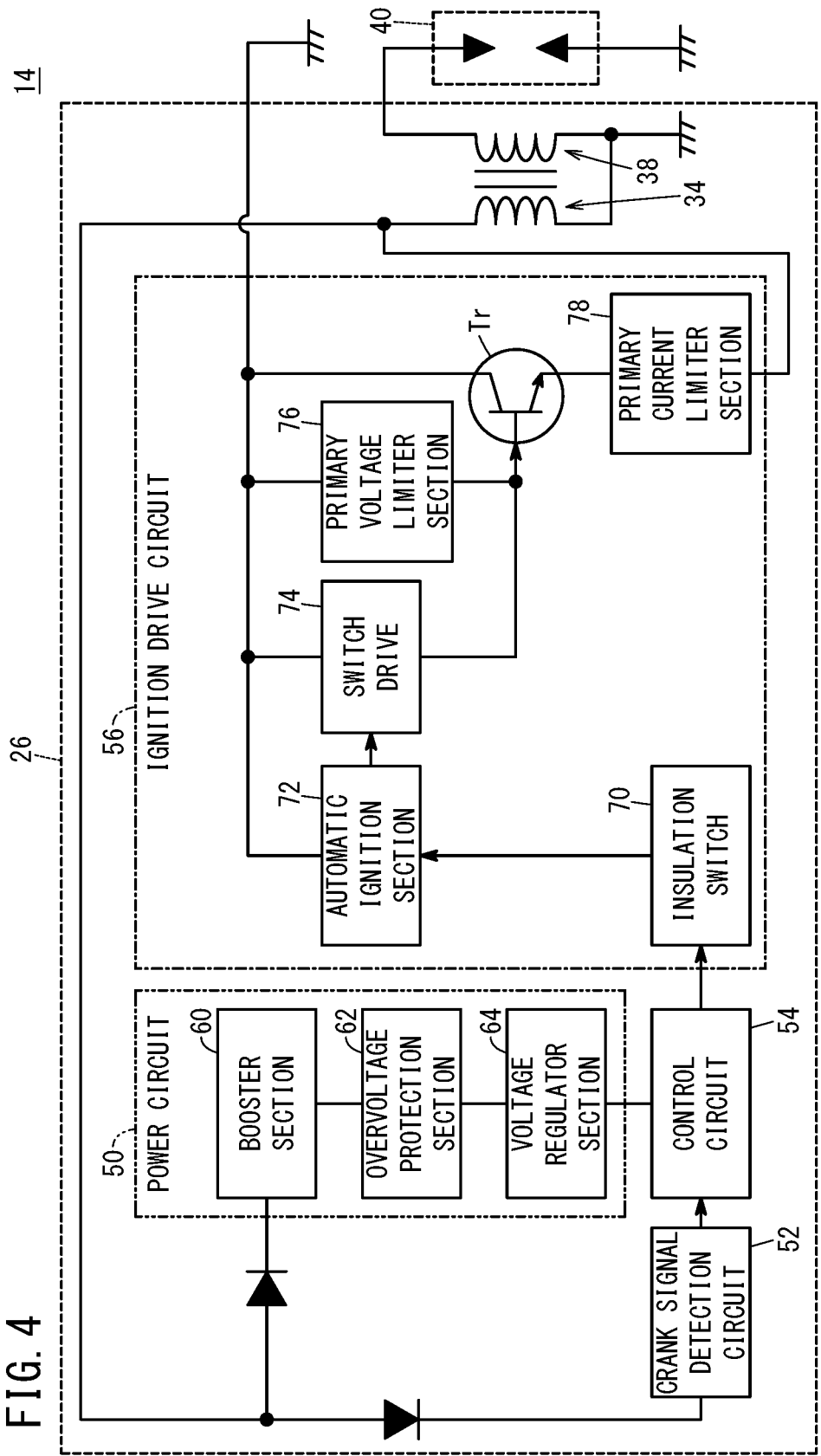
FIG. 4 is a view showing a circuit configuration of an ignition device.

Next, the circuit configuration of the ignition device 14 will be described with reference to FIG. 4. The ignition device 14 primarily includes, as circuits provided on the substrate 39 in the ignition unit 26, a power circuit 50, a crank signal detection circuit 52, a control circuit 54, and an ignition drive circuit 56. The primary coil 34, the secondary coil 38, and the spark plug 40 illustrated in FIG. 4 are not the circuits provided on the substrate 39.

The power circuit 50 generates a driving voltage for driving the control circuit 54 based on the primary voltage induced in the primary coil 34. The power circuit 50 includes a booster section 60 boosting the primary voltage induced in the primary coil 34, an overvoltage protection section 62 preventing the boosted primary voltage from going overvoltage, and a voltage regulator section 64 regulating the boosted primary voltage to thereby output a substantially constant driving voltage.

The crank signal detection circuit 52 detects a rotational angle based on the primary voltage induced in the primary coil 34. The crank signal detection circuit 52 outputs the result of the detection of the rotational angle to the control circuit 54 as a crank signal.

The control circuit 54 is driven by the driving voltage supplied from the power circuit 50. When driven, the control circuit 54 controls the ignition drive circuit 56 based on the crank signal output from the crank signal detection circuit 52.

The ignition drive circuit 56 causes a primary current to flow in the ignition unit 26 using the primary voltage induced in the primary coil 34 and then shuts off the primary current to thereby induce the secondary voltage in the secondary coil 38. The ignition drive circuit 56 includes a transistor Tr, an insulation switch 70, an automatic ignition section 72, a switch drive 74, a primary voltage limiter section 76, and a primary current limiter section 78.

The transistor Tr is used for causing the primary current to flow in the primary coil 34. The base of the transistor Tr is connected to the switch drive 74. The collector of the transistor Tr is connected to the ground. The emitter of the transistor Tr is connected to one end of the primary coil 34. The one end of the primary coil 34 is one of the both ends of the primary coil 34 that is opposite to an end connected to the ground.

The insulation switch 70 is electrically insulated from the control circuit 54 and outputs a switching signal according to an ignition command given by the control circuit 54. Specific examples of the insulation switch 70 include a photocoupler and the like.

The automatic ignition section 72 initiates application of the primary current to the primary coil 34 when the primary voltage induced in the primary coil 34 has crossed a predetermined threshold. The threshold is set to a value lower than the minimum voltage required for driving the control circuit 54. This allows the primary current to flow in the primary coil 34 even when the flywheel 20 rotates at a low speed and consequently the driving voltage generated by the power circuit 50 does not reach the minimum voltage. The phrase "when the primary voltage has crossed the predetermined threshold" refers to, for example, when the primary voltage has dropped to the predetermined threshold or less after increasing to the predetermined threshold or more, or when the primary voltage has increased to the predetermined threshold or more after the primary current starting to flow in the primary coil 34.

Specifically, the automatic ignition section 72 generates and outputs a drive signal to the switch drive 74 when the primary voltage induced in the primary coil 34 has crossed the predetermined threshold. On the other hand, when the control circuit 54 is driven by the driving voltage generated by the power circuit 50, the insulation switch 70 gives the switching signal to the automatic ignition section 72. While receiving the switching signal from the insulation switch 70, the automatic ignition section 72 is outputting the switching signal to the switch drive 74 instead of the drive signal.

The switch drive 74 drives the transistor Tr in accordance with the drive signal or the switching signal. More specifically, the switch drive 74 turns the transistor Tr on or off in accordance with the drive signal while receiving the drive signal. Alternatively, the switch drive 74 turns the transistor Tr on or off in accordance with the switching signal while receiving the switching signal. When the transistor Tr is turned on, the primary current flows from the collector to the emitter of the transistor Tr, so that the primary current flows through the primary coil 34. On the other hand, when the transistor Tr is turned off, the flow of the primary current to the primary coil 34 is shut off.

The primary voltage limiter section 76 limits the primary voltage such that the secondary voltage induced in the secondary coil 38 does not exceed a predetermined value. The primary voltage limiter section 76 is disposed between the base of the transistor Tr and the ground. A Zener diode or a snubber circuit, for example, may be used as the primary voltage limiter section 76.

The primary current limiter section 78 limits the primary current flowing in the primary coil 34 such that the maximum value of the primary current is less than or equal to a predetermined value. The primary current limiter section 78 is disposed between the emitter of the transistor Tr and the one end of the primary coil 34. For example, a resistor with an appropriate value may be used as the primary current limiter section 78.

Figure 5:
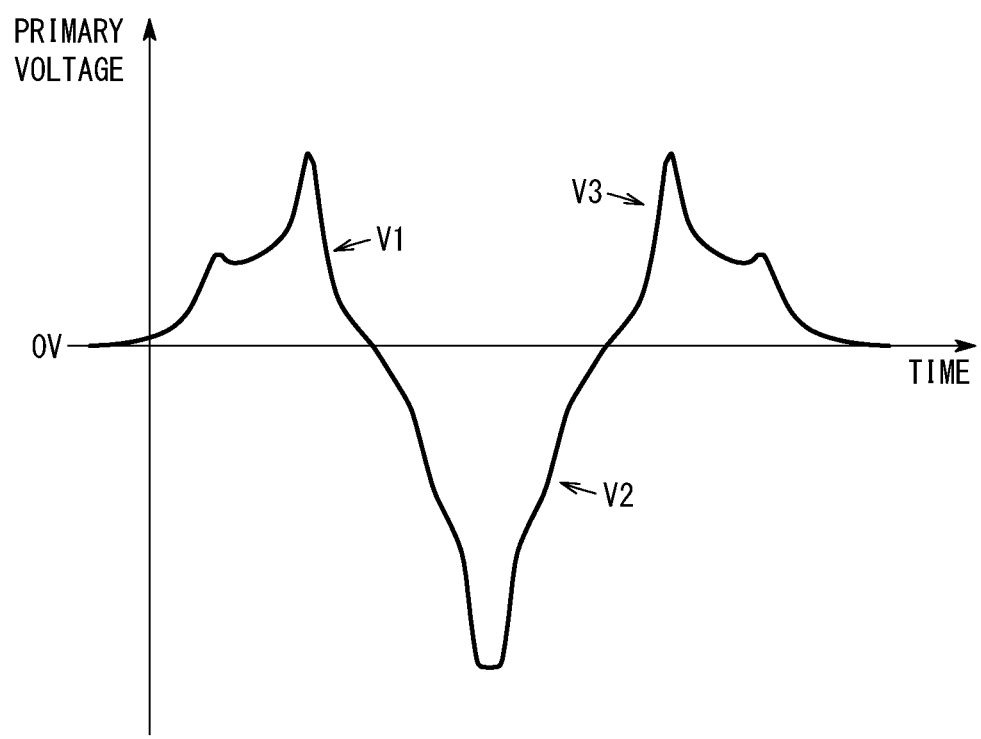
FIG. 5 is a chart showing a waveform of a primary voltage.

Next, the primary voltage induced in the primary coil 34 will be described with reference to FIG. 5. When the flywheel 20 rotates in conjunction with the rotation of the crankshaft and the permanent magnet 22 disposed on the outer circumferential surface of the flywheel 20 approaches the ignition unit 26, a sub voltage V1 (positive primary voltage) is induced in the primary coil 34 while the rotational angle is in a predetermined range.

As the flywheel 20 further rotates and the permanent magnet 22 faces toward the ignition unit 26, a main voltage V2 (negative primary voltage) is induced in the primary coil 34 instead of the sub voltage V1 while the rotational angle is in a predetermined range. As the flywheel 20 further rotates, a sub voltage V3 is induced again in the primary coil 34 instead of the main voltage V2 while the rotational angle is in a predetermined range. As the flywheel 20 further rotates and the permanent magnet 22 is separated from the ignition unit 26, the sub voltage V3 disappears.

Next, operations of the ignition device 14 will be described with reference to FIG. 4. As described above, when the sub voltage V1, V3 is induced in the primary coil 34, electric current flows in the primary coil 34 from the other end (the ground side) toward the one end (the opposite side of the ground). At this time, in the ignition device 14, the power circuit 50 generates the driving voltage, and the control circuit 54 controlling the ignition drive circuit 56 is driven based on the driving voltage.

On the other hand, when the main voltage V2 is induced in the primary coil 34, electric current flows in the primary coil 34 from the one end (the opposite side of the ground) toward the other end (the ground side). At this time, the control circuit 54 is being driven based on the sub voltage V1 induced before induction of the main voltage V2, and controls the ignition drive circuit 56 based on the crank signal. That is, the control circuit 54 drives the transistor Tr in the ignition drive circuit 56 to cause the primary current to flow in the primary coil 34, and at a predetermined rotational angle, stops the transistor Tr to shut off the primary current flowing in the primary coil 34. This causes the secondary voltage for ignition to be induced in the secondary coil 38.

The levels of the sub voltages V1 and V3 induced during low speed rotation, for example, at startup, are low. In this embodiment, however, the control circuit 54 can still be driven to cause the primary current to flow in the primary coil 34 using the low sub voltages V1 and V3 due to the booster section 60 in the power circuit 50. Consequently, the startability during low speed rotation can be improved.

During extremely low speed rotation, the speed of which is relatively lower than the speed during low speed rotation, even if the sub voltages V1 and V3 are boosted using the booster section 60, the driving voltage for the control circuit 54 may not be generated. In such a case, according to this embodiment, however, the primary current can still be caused to flow in the primary coil 34 due to the automatic ignition section 72 in the ignition drive circuit 56. Consequently, the startability and the stability during low speed rotation can be improved.

In this embodiment, the automatic ignition section 72 initiates the application of the primary current to the primary coil 34 when the primary voltage induced in the primary coil 34 has crossed the predetermined threshold. Owing to this, the automatic ignition section 72 can cause the primary current to flow in the primary coil 34 in a case where the driving voltage for the control circuit 54 cannot be generated. In particular, in the case where the automatic ignition section 72 initiates the application of the primary current to the primary coil 34 when the primary voltage exceeding the predetermined threshold has dropped to the predetermined threshold or less, misfiring can be prevented even during extremely low speed rotation due to a reduced rotational speed resulting from the load generated after the startup. Thus, the startability and the stability during low speed rotation can be further improved.

EXAMPLE

Example 1

Figure 6:
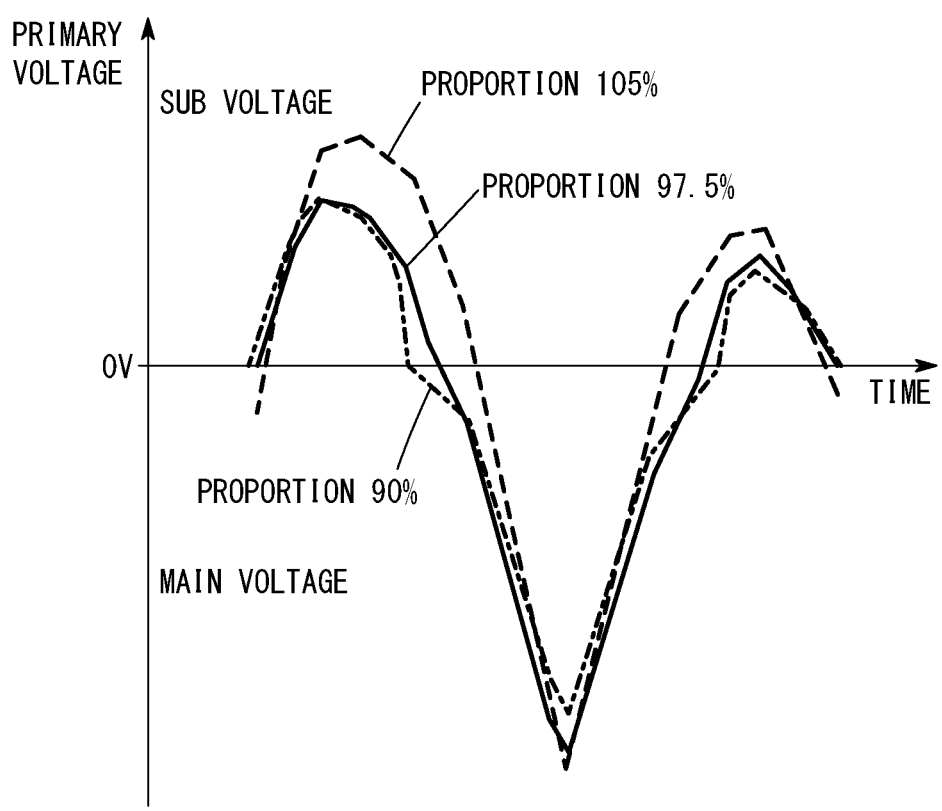
FIG. 6 is a chart showing waveforms of the primary voltage in Example 1.

In Example 1, under the condition that the proportion of the yoke end width W2 to the magnet width W1 was fixed to 70%, waveforms of the primary voltage when the proportions of the magnet width W1 to the yoke interval IN were 105%, 97.5%, and 90% were measured. FIG. 6 shows the measurement results. The primary voltage waveforms shown in FIG. 6 were measured while the ignition drive circuit 56 was not provided with the primary current limiter section 78.

As illustrated in FIG. 6, the primary voltage waveform obtained when the proportion of the magnet width W1 to the yoke interval IN was 90% had a lower sub voltage than the primary voltage waveform obtained when the proportion was 97.5%. On the other hand, the primary voltage waveform obtained when the proportion of the magnet width W1 to the yoke interval IN was 105% had a narrower peak width in a main voltage and a smaller advanced angle range than the primary voltage waveform obtained when the proportion was 97.5%.

As a result of study, it has been understood that the proportion of the magnet width W1 to the yoke interval IN that significantly satisfies both conditions that the sub voltage in the primary voltage waveform be high and that the advanced angle range of the main voltage be wide, was in a range of 95% to 100%. The primary voltage waveforms illustrated in FIG. 6 were part of the study.

That is, when the proportion of the magnet width W1 to the yoke interval IN was in the range of 95% to 100%, electric power for driving the control circuit 54 can be secured and concurrently discharge energy also can be secured. Thus, the output power of the internal combustion device 10 can be increased without deteriorating the startability of the internal combustion device 10.

Example 2

In Example 2, under the condition that the proportion of the magnet width W1 to the yoke interval IN was fixed to 100%, waveforms of the primary voltage when the proportions of the yoke end width W2 to the magnet width W1 were 40%, 60%, 80%, and 100% were measured. FIG. 7 shows the measurement results. It is noted that, in the primary voltage waveforms shown in FIG. 7, the horizontal axis represents the mechanical angle (°), and measurement was performed while the ignition drive circuit 56 was provided with the primary current limiter section 78. Thus, the shapes of the primary voltage waveforms shown in FIG. 7 slightly differ from the shapes of the primary voltage waveforms shown in FIG. 6.

In FIG. 7, an ignition control range θw is a region in which enough main voltage for ignition can be secured, that is, a mechanical angle range in which ignition control is enabled at any point. As shown in FIG. 7, in the primary voltage waveforms obtained when the proportions of the yoke end width W2 to the magnet width W1 were 60% or more, the main voltage was generated within the predetermined ignition control range θw starting with a reference angle θ0 set based on the primary voltage being switched from V1 to V2. In contrast, in the primary voltage waveform obtained when the proportion of the yoke end width W2 to the magnet width W1 was 40%, there were angles (times) at which the main voltage was not generated within the ignition control range θw. It has been understood that the primary voltage waveform containing such angles (times) at which the main voltage was not generated was obtained when the proportion of the yoke end width W2 to the magnet width W1 was less than 60%. Moreover, in a case where the proportion of the yoke end width W2 to the magnet width W1 exceeded 100%, a large main voltage could be generated. However, this would lead to an increase in the size of the device. Therefore, by selecting an appropriate proportion, it is possible to provide the device having an appropriate size while the main voltage can be secured within the ignition control range θw.

That is, a wide advanced angle range can be secured when the proportion of the yoke end width W2 to the magnet width W1 is in the range of 60% to 100%. Thus, the output power of the internal combustion device 10 can be increased.

Moreover, as is clear from FIG. 7, when the proportion of the yoke end width W2 to the magnet width W1 was in the range of 60% to 100%, the sub voltage was able to be increased compared with the case where the proportion was less than 60%. Thus, the startability of the internal combustion device 10 can be improved.

In this manner, when the proportion of the yoke end width W2 to the magnet width W1 is in the range of 60% to 100%, it is possible to increase the output power of the internal combustion device 10 while improving the startability of the internal combustion device 10.

Technical Scope Obtained from Embodiment

The technical scope understood from the above-described embodiment and examples will be now described below.

An ignition device (14) includes a core (24) disposed on an outer side of a flywheel (20), an ignition unit (26) provided on the core (24), and a pair of yokes (28) spaced from each other so as to interpose the ignition unit (26) between the yokes and extending from one end and another end of the core (24) toward the flywheel (20).

The ignition unit (26) includes a primary coil (34) wound around an outer circumferential side of the core (24), a secondary coil (38) wound around an outer circumferential side of the primary coil (34), an ignition drive circuit (56) configured to cause a primary current to flow in the primary coil (34) using a primary voltage induced in the primary coil (34) and also configured to shut off the primary current to thereby induce a secondary voltage in the secondary coil (38), a control circuit (54) configured to control the ignition drive circuit (56), and a power circuit (50) including a booster section (60) configured to boost the primary voltage, the power circuit being configured to generate a driving voltage for driving the control circuit (54) using the boosted primary voltage.

An end portion (28a) of each of the pair of yokes (28) protrudes so as to be away from the core (24) in a circumferential direction of the flywheel (20).

In the ignition device (14), a proportion of a yoke end width (W2) defined as a distance from one end to another end of the end portion (28a) in the circumferential direction to a magnet width (W1) defined as a distance from one end to another end of a permanent magnet (22) disposed on an outer circumferential surface of the flywheel (20), in the circumferential direction is in a range of 60% to 100%. Moreover, a proportion of the magnet width (W1) to a yoke interval (IN) between the pair of yokes (28) is in a range of 95% to 100%.

According to the ignition device (14), a wide advanced angle range is secured while the sub voltage (V1, V3) is increased. Thus, the output power of the internal combustion device (10) can be increased while the startability is improved.

Since the power circuit (50) includes the booster section (60), even when the primary voltage is low, the control circuit (54) can be driven to cause the primary current to flow in the primary coil (34). Consequently, the startability during low speed rotation can be further improved.

Conventionally, for improving the startability during low speed rotation, a large power source performing the function of the booster section (60) has been provided separately from the primary coil, the secondary coil, and the power circuit. In contrast, in the ignition device (14), the booster section (60) in the power circuit (50) and the secondary coil (38) wound around the outer circumferential side of the primary coil (34) can improve the startability during low speed rotation. Owing thereto, it is possible to reduce the number of parts in the ignition device (14) and also reduce the device in size, compared with conventional cases.

The ignition drive circuit (56) may include a primary voltage limiter section (76) configured to limit the primary voltage. This prevents excessive secondary voltage from being applied to the spark plug (40), thereby reducing deterioration of the spark plug (40).

The ignition drive circuit (56) may include a primary current limiter section (78) configured to limit the primary current flowing in the primary coil (34). This prevents excessive primary current from flowing in the ignition drive circuit (56) and the primary coil (34), thereby preventing deterioration of circuit components of the ignition drive circuit (56) and deterioration of the ignition unit (26) caused by heat.

The ignition drive circuit (56) may include an automatic ignition section (72) configured to initiate application of the primary current to the primary coil (34) when the primary voltage induced in the primary coil (34) has crossed a predetermined threshold. This further improves the startability during low speed rotation. This also prevents misfiring during extremely low speed rotation, i.e., when the rotational speed is lowered due to a generated load.

The present invention is not particularly limited to the embodiment described above, and various modifications are possible without departing from the essence and gist of the present invention.

What is claimed is:

1. An ignition device comprising:
   a core disposed on an outer side of a flywheel;
   an ignition unit provided on the core; and
   a pair of yokes spaced from each other so as to interpose the ignition unit between the yokes and extending from one end and another end of the core toward the flywheel;
   wherein the ignition unit includes:
     a primary coil wound around an outer circumferential side of the core;
     a secondary coil wound around an outer circumferential side of the primary coil;
     an ignition drive circuit configured to cause a primary current to flow in the primary coil using a primary voltage induced in the primary coil and also configured to shut off the primary current to thereby induce a secondary voltage in the secondary coil;
     a control circuit configured to control the ignition drive circuit; and
     a power circuit including a booster section configured to boost the primary voltage, the power circuit being configured to generate a driving voltage for driving the control circuit using the boosted primary voltage;
   wherein an end portion of each of the pair of yokes protrudes so as to be away from the core in a circumferential direction of the flywheel;
   wherein a proportion of a yoke end width defined as a distance from one end to another end of the end portion in the circumferential direction to a magnet width defined as a distance from one end to another end of a permanent magnet disposed on an outer circumferential surface of the flywheel, in the circumferential direction is in a range of 60% to 100%; and
   wherein a proportion of the magnet width to a yoke interval between the pair of yokes is in a range of 95% to 100%.

2. The ignition device according to claim 1, wherein the ignition drive circuit includes a primary voltage limiter section configured to limit the primary voltage.

3. The ignition device according to claim 1, wherein the ignition drive circuit includes a primary current limiter section configured to limit the primary current flowing in the primary coil.

4. The ignition device according to claim 2, wherein the ignition drive circuit includes a primary current limiter section configured to limit the primary current flowing in the primary coil.

5. The ignition device according to claim 1, wherein the ignition drive circuit includes an automatic ignition section configured to initiate application of the primary current to the primary coil when the primary voltage induced in the primary coil has crossed a predetermined threshold.

6. The ignition device according to claim 2, wherein the ignition drive circuit includes an automatic ignition section configured to initiate application of the primary current to the primary coil when the primary voltage induced in the primary coil has crossed a predetermined threshold.

7. The ignition device according to claim 3, wherein the ignition drive circuit includes an automatic ignition section configured to initiate application of the primary current to the primary coil when the primary voltage induced in the primary coil has crossed a predetermined threshold.

8. The ignition device according to claim 4, wherein the ignition drive circuit includes an automatic ignition section configured to initiate application of the primary current to the primary coil when the primary voltage induced in the primary coil has crossed a predetermined threshold.

* * * * *